July 28, 1931.    J. LEDWINKA    1,816,333
COWL CONSTRUCTION FOR VEHICLE BODIES
Filed Dec. 21, 1927
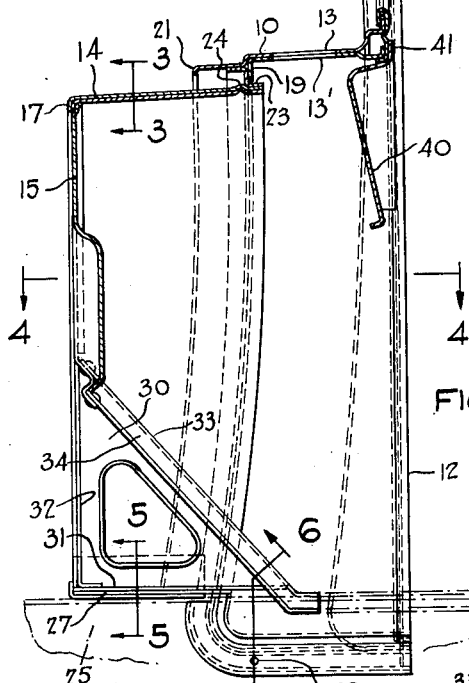
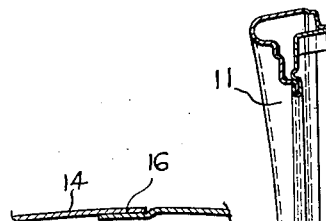
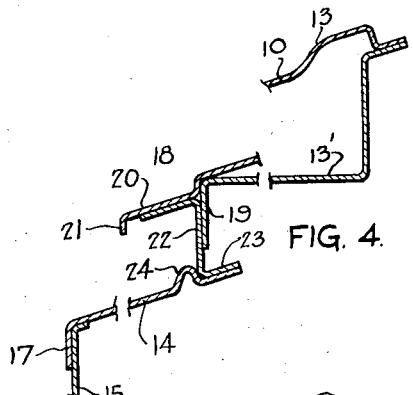
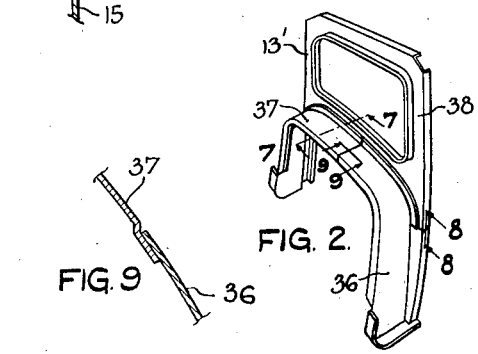
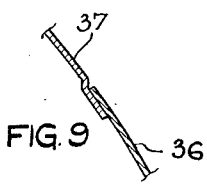
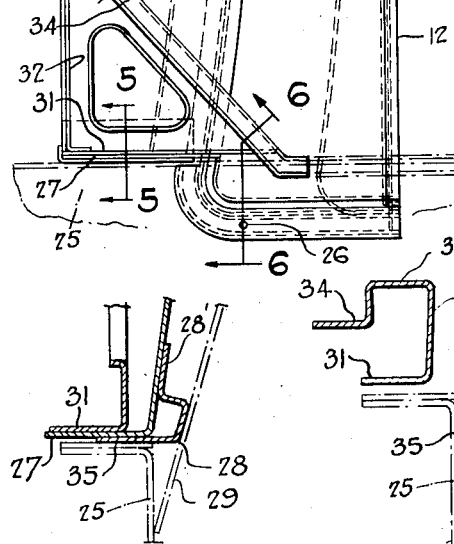
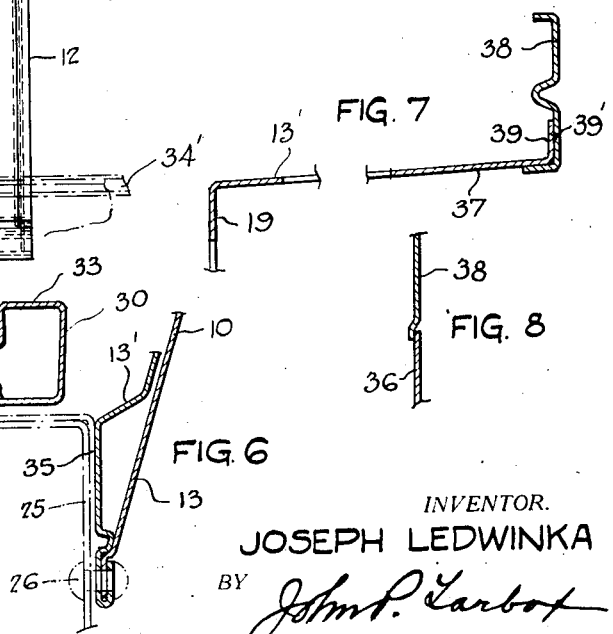
INVENTOR.
JOSEPH LEDWINKA
BY
ATTORNEY.

Patented July 28, 1931

1,816,333

UNITED STATES PATENT OFFICE

JOSEPH LEDWINKA, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA

COWL CONSTRUCTION FOR VEHICLE BODIES

Application filed December 21, 1927. Serial No. 241,692.

My invention relates to automobile body front or cowl structures and more particularly to such structures made of sheet metal stampings.

It has heretofore been proposed to make the cowl or front structure of automobiles including the cowl, and portions of the front posts and windshield frame of a unitary outer stamping, and to reinforce this outer stamping with a correspnnding inner unitary panel. To insure ease of manufacture of these large stampings and to improve the appearance of the car as a whole of which a body so constructed forms a part, the cowl of such bodies has been made relatively short and left without a shroud pan, or toe-board supports, these being usually mounted directly on the chassis in advance of the cowl.

It is a main object of my invention to retain the advantages in manufacture and appearance of the short cowl of normal section or cowl proper, but to mount on the body so as to form a part thereof the shroud pan and toe board supports in such manner as to strengthen the cowl unit as a whole and to interfere not at all with the seating of the hood, as usual, on the front edge of the cowl of normal section or cowl proper.

I attain this object in large part by providing the short cowl proper with a forward extension of reduced section which carries the shroud pan and toe-board supports and reinforces and strengthens the cowl proper.

Other objects and advantages of the novel improved cowl structure will become apparent from the following detailed description when read in connection with the accompanying drawings, in which;

Fig. 1 represents in a central longitudinal sectional view one embodiment of the novel improved cowl structure of my invention, Fig. 2 represents, in perspective, the inner panel unit, Figs. 3, 4, 5 and 6 represent detail sectional views taken respectively, on the correspondingly numbered lines of Fig. 1, Figs. 7, 8 and 9 represent detail sectional views taken respectively, on the correspondingly numbered lines of Fig. 2.

In the drawings, the cowl proper 10, the windshield frame 11, and portions of the front posts 12 are formed as a hollow structure throughout, being formed by unitary outer and inner panels 13 and 13', which are preferably formed as unitary sheet metal stampings, and are joined together in their outer margins and in the margins of the windshield frame.

The cowl proper of normal section is extended forward by a forward portion or sub-cowl 14 of reduced cross section which has secured to its forward edge, as by welding, the usual shroud pan 15.

This reduced forward extension or sub-cowl 14 is formed, in the embodiment of my invention shown, of two parts joined at the central vertical plane by a lap joint 16 as is clearly shown in Figs. 1 and 3. Its forward edge is flanged inwardly at 17 and to this flange is secured the shroud pan 15.

The sub-cowl is rigidly secured so as to strongly reinforce the cowl proper 10 in the following manner.

The outer and inner panels 13 and 13' of the cowl are both flanged inwardly at their forward portions, respectively, to form the flanges 18 and 19, and welded together through these flanges. Flange 18 of the outer panel is of a depth just sufficient to form, with the forwardly extending offset portion 20, a seat for the rear edge of the hood (not shown), the offset portion being reinforced at its forward edge by a narrow flange 21. The flange 19 of the inner panel is extended inwardly a substantial distance beyond the inner portion of the flange 18 of the outer panel and forms with the offset portion 20 of the outer panel an angle, within which is nested the outer arm and web of a stiffening and reinforcing strip 22 of Z-section, which conforms to the curvature of the front edge of the cowl and extends along the sides and top thereof. This strip 22 is rigidly secured, as by welding, to both the flange 19 of the inner panel 13' and to the offset 20 of the outer panel 13 and forms the means through which the cowl extension or sub-cowl 14 is connected to the cowl proper, The sub-cowl 14 is rigidly secured to the inner rearwardly extending arm 23 of the Z-section strip 22 as by welding its rear edge thereto. It can readily be assembled with the cowl proper by telescoping its rear end into the strip 22 until the bead 24 formed adjacent its rear edge engages the front of said strip.

The novel cowl structure also lends itself to ready mounting on the chassis sills which in this type of body, conform to the contour of the sides of the body. By reference to Figs. 1 and 6, it will be seen that the bottom edge of the cowl proper, made by the crimped joinder of the outer and inner panels 13, and 13' overlaps the side of the chassis sill, shown in dotted lines at 25, and is secured thereto as by the rivets 26.

The sub-cowl 14, as shown in Figs. 1 and 5 terminates short of the bottom of the cowl proper and is supported on top of the chassis sill through the inwardly extending flange 27.

Thus through the cowl proper and sub-cowl the entire cowl structure has at the bottom, in effect, an angular conformation which nests with the top and side of the chassis sill. This provides for a ready locating of the body on the chassis in position for securement of the cowl structure with the chassis, or body underframe.

At its bottom edge the sub-cowl is reinforced by a channel section stamping 28 which is secured by one of its side walls to the bottom of the flange 27 of the sub-cowl 14 and has its other side wall laterally flanged at 28', through which it is welded to the sub-cowl panel. The bottom of this channel is substantially in line with the offset 20 on the forward edge of the cowl proper and serves to support and space the bottom edge of the hood 29, as indicated in dotted lines in Fig. 5, The toe-board supports 30 which are shown as comprising triangular shaped sheet metal stampings are flanged along their three edges as shown at 31, 32 and 33. They are secured in the sub-cowl by welding the front flanges 32 to the shroud pan 15 and the bottom flange 31 to the bottom flange 27 of the sub-cowl panel 14. The top inclined flange 33 is formed with the usual offset portion 34 to form a seat for the edge of the floor boards. This top flange is extended at the rear to form a horizontal portion matching up with the horizontal floor board support 34' on the chassis, indicated in dot and dash lines, Fig. 1.

Where the cowl structure engages the chassis sill, a suitable sound deadening material 35, see Figs. 5 and 6, may be inserted between it and the chassis.

According to my invention, I form the inner panel 13', for convenience of manufacture, from three sheet metal stampings, 36, 37 and 38, Figs. 2, 7, 8 and 9. Two of these stampings 36 and 37 each form a side of the cowl and a portion of the front post at the rear edge thereof. They are joined at the center by welding their overlapping edges as illustrated in Fig. 9. At the rear the cowl section is formed with an upwardly extending flange 39 which extends across the top and part way down the sides and through which the windshield panel 38 is secured by having its lower flanged edge nested with and welded to the rear edge of the cowl portion, as shown at 39' in Fig. 7. The side post portions of the upper stamping 38 are welded through the overlapping edges of the stampings as shown in Fig. 8 to the post portions on the cowl section. The division into stampings of this extent facilitates the forming operations and also permits the use of smaller sheets.

The one piece instrument panel stamping 40 is formed at its rear upper edge with an angular formation 41 and which is curved transversely to match the transverse curvature of the inner panel, whereby it can be readily assembled with the inner panel by nesting this angular formation with the corresponding inner side of the inner panel and joining them by spot welding or otherwise securing them rigidly together. In this way, the instrument board strongly reinforces the cowl across the front post section thereof.

While I have herein described a specific embodiment of my invention, it will be understood that changes and modifications may be made without departing from the spirit and substance of my invention, and all such changes and modifications are intended to come within the spirit and scope of the appended claims.

What I claim is:

1. In a vehicle body construction, a rear cowl portion comprising inner and outer panels secured together adjacent their forward edges, and a sub-cowl section of reduced section extending forwardly of said rear cowl portion and secured to both the inner and outer panels of said rear portion.

2. In a vehicle body construction, a rear cowl section of normal section and a forward sub-cowl section of reduced section, said rear section being formed of outer and inner panels secured together adjacent their forward edges, the inner panel being flanged inwardly at its forward edge, a Z-shaped reinforcing member secured through one of its arms to the outer panel and through its web to the flange of the inner panel of said rear section, and having its other arm overlapped by the rear edge of the sub-cowl section and rigidly secured thereto.

3. In a vehicle body construction, a rear cowl section of normal section and extended downwardly to overlap the sides of the chassis sills, and a forward cowl extension of reduced section terminating short of the lower edge of the rear cowl section and adapted to rest on top of the chassis sills.

4. In a vehicle body construction, a rear cowl section of normal section provided with a seat at its forward edge to receive the rear edge of the hood, and extending downwardly at the sides to overlap the outside of the chassis sills, and a forward cowl extension of reduced section having means at its lower edges in substantial alignment with said seat to support the lower edges of the hood in spaced relation from said reduced cowl section.

5. In a vehicle body construction, a body unit comprising a rear cowl portion of normal section conforming to the lines of the hood and having an offset seat at its forward edge to receive the rear edge of the hood, and a sub-cowl extension of the rear cowl portion offset inwardly from said offset seat and extending said rear cowl portion forwardly under the hood a substantial distance to provide footroom for the occupants of the front seat.

6. In a vehicle body construction, an inner reinforcing unit comprising a forwardly extending panel portion conforming generally to the sides and top of a cowl portion and flanged substantially vertically along its rear edge, and a separate stamping forming a substantially vertically extending windshield frame member extending entirely around the windshield opening and secured along its lower edge to said flange, said unit being flanged in its margins for securement to the outer portion of the cowl.

7. In a vehicle body construction, a rear cowl portion of normal section reinforced at its forward edge by an angular seat to receive the rear edge of the hood, and an angular strip secured to the inner surface of said seat, and a sub cowl forming a substantial forward extension of said rear cowl portion secured to the inner portion of said strip and through it to the rear cowl portion.

In testimony whereof I hereunto affix my signature.

JOSEPH LEDWINKA.